US006936653B2

(12) United States Patent
McElrath et al.

(10) Patent No.: US 6,936,653 B2
(45) Date of Patent: Aug. 30, 2005

(54) COMPOSITE MATERIALS COMPRISING POLAR POLYMERS AND SINGLE-WALL CARBON NANOTUBES

(75) Inventors: Kenneth O. McElrath, Houston, TX (US); Kenneth A. Smith, Houston, TX (US); Thomas M. Tiano, Westford, MA (US); Margaret E. Roylance, West Newton, MA (US)

(73) Assignee: Carbon NanoTechnologies, Inc., Houston, TX (US)

( * ) Notice: Subject to any disclaimer, the term of this patent is extended or adjusted under 35 U.S.C. 154(b) by 102 days.

(21) Appl. No.: 10/389,256

(22) Filed: Mar. 14, 2003

(65) Prior Publication Data

US 2003/0216502 A1 Nov. 20, 2003

Related U.S. Application Data

(60) Provisional application No. 60/364,170, filed on Mar. 14, 2002.

(51) Int. Cl.$^7$ ................................................ C08K 3/04
(52) U.S. Cl. .................... 524/496; 524/495; 423/447.3; 423/447.2; 423/445 R
(58) Field of Search ................................ 524/496, 495; 423/447.3, 447.2, 445 R, 445 B (56) References Cited

U.S. PATENT DOCUMENTS

| 5,591,382 | A | | 1/1997 | Nahass et al. ............... 252/511 |
| 5,643,502 | A | | 7/1997 | Nahass et al. ............... 252/511 |
| 5,651,922 | A | | 7/1997 | Nahass et al. ............... 252/511 |
| 6,265,466 | B1 | * | 7/2001 | Glatkowski et al. ........ 523/137 |
| 6,426,134 | B1 | * | 7/2002 | Lavin et al. ............. 428/300.1 |
| 2002/0046872 | A1 | * | 4/2002 | Smalley et al. ......... 174/137 A |

FOREIGN PATENT DOCUMENTS

| WO | WO 02/16257 A2 | * | 2/2002 |
| WO | WO02/080195 | | 10/2002 |

OTHER PUBLICATIONS

Tahhan et al., "Conducting polymer–carbon nanotubes composites", IEEE–NANO, 229–232(2001).*
Coleman et al., "Percolation–dominated conductivity in a conjugated–polymer–carbon–nanotube composite", Physical Review B 58, R7492–R7495 (1998).*
Alexandrou et al., "Polymer–nanotube composites: burying nanotubes improves their field emission properties" Applied Physics Letters, 80(8), 1435–1437(2002).*
Fan et al., Synthesis and properties of carbon nanotube––polypyrrole composites, Synthetic Metals, 102, 1266–1267(1999).*
Kymakis et al., "Single–wall carbon nanotube/conjugated polymer photovoltaic devices", Applied Physics Letters 80(1), 112–114(2002).*
Haggenmueller et al., "Aligned single–wall carbon nanotubes in composites by melt processing methods", Chemical Physics Letters, 330, 219–225(2000).*

Woo et al., "Hole blocking in carbon nanotube–polymer composite organic light–emitting diodes based on poly(m–phenylene vinylene–co–2,5–dioctoxy–p–phenylene vinylene)", Applied Physics Letters, 77(9), 1393–1395(2000).*
Benoit et al. , "Transport properties of PMMA–carbon nanotube composites" Synthetic Metals, 121, 1215–1216 (2001).*
Tahhan et al., "Conducting Polymer–Carbon Nanotubes Composites," *IEEE–NANO*, pp. 229–232 (2001).
Benoit et al., "Transport Properties of PMMA–Carbon Nanotubes Composites," *Synthetic Metals* 121:1215–1216 (2001).
Shaffer et al., "Fabrication and Characterization of Carbon Nanotube/Poly(vinyl alcohol) Composites," *Advanced Materials* 11:937–941 (1999).
Coleman et al., "Percolation–Dominated Conductivity in a Conjugated–Polymer–Carbon–Nanotube Composite," *Physical Review B* 58:R7492–R7495 (1998).
Ahuwalia et al., "Microfabricated Electroactive Carbon Nanotube Actuators," *Smart Structures and Materials* 4329:209–215 (2001).

(Continued)

*Primary Examiner*—Ling-Sui Choi
(74) *Attorney, Agent, or Firm*—Williams, Morgan & Amerson, P.C.

(57) ABSTRACT

The invention relates to a composite comprising a weight fraction of single-wall carbon nanotubes and at least one polar polymer wherein the composite has an electrical and/or thermal conductivity enhanced over that of the polymer alone. The invention also comprises a method for making this polymer composition. The present application provides composite compositions that, over a wide range of single-wall carbon nanotube loading, have electrical conductivities exceeding those known in the art by more than one order of magnitude. The electrical conductivity enhancement depends on the weight fraction (F) of the single-wall carbon nanotubes in the composite. The electrical conductivity of the composite of this invention is at least 5 Siemens per centimeter (S/cm) at (F) of 0.5 (i.e. where single-wall carbon nanotube loading weight represents half of the total composite weight), at least 1 S/cm at a F of 0.1, at least $1 \times 10^{-4 S/cmat\ (F) of 0.004, at least 6 \times 10^{-9}}$ S/cm at (F) of 0.001 and at least $3 \times 10^{-16}$ S/cm (F) plus the intrinsic conductivity of the polymer matrix material at of 0.0001. The thermal conductivity enhancement is in excess of 1 Watt/m-° K. The polar polymer can be polycarbonate, poly (acrylic acid), poly(acrylic acid), poly(methacrylic acid), polyoxide, polysulfide, polysulfone, polyamides, polyester, polyurethane, polyimide, poly(vinyl acetate), poly(vinyl alcohol), poly(vinyl chloride), poly(vinyl pyridine), poly (vinyl pyrrolidone), copolymers thereof and combinations thereof. The composite can further comprise a nonpolar polymer, such as, a polyolefin polymer, polyethylene, polypropylene, polybutene, polyisobutene, polyisoprene, polystyrene, copolymers thereof and combinations thereof.

14 Claims, 5 Drawing Sheets

OTHER PUBLICATIONS

Fan et al., "Synthesis and Properties of Carbon Nanotube–Polypyrrole Composites," *Synthetic Metals* 102:1266–1267 (1999).

Haggenmueller et al., "Aligned Single–Wall Carbon Nanotubes in Composites by Melt Processing Methods," *Chemical Physics Letters* 330:219–225 (2000).

Withers et al., "The Development of Carbon Nanotube Polymer Composites," *Proceedings of the American Society for Composites, Technical Conference* (2001) (abstract).

PCT/US03/07548 International Search Report (Aug. 8, 2003).

PCT/US03/07956 International Search Report (Aug. 8, 2003).

Alexandrou et al., "Polymer–Nanotube Composites: Burying Nanotubes Improves Their Field Emission Properties," *Applied Physics Letters* 80:1435–1437 (2002).

Dufresne et al., "Processing and Characterization of Carbon Nanotube/Poly(Styrene–co–Butyl Acrylate) Nanocomposites," *Journal of Materials Science* 37:3915–3923 (2002).

Kymakis et al., "Single Wall Carbon Nanotube/Conjugated Polymer Photovoltaic Devices," *Applied Physics Letters* 80:112–114(2002).

Pötschke et al., "Rheological Behavior of Multiwalled Carbon Nanotube/Polycarbonate Composites," *Polymer* 43:3247–3255 (2002).

Safadi et al., "Multiwalled Carbon Nanotube Polymer Composites: Synthesis and Characterization of Thin Films," *Journal of Applied Polymer Science* 84:2660–2669 (2002).

Stéphan et al., "Raman Spectroscopy and Conductivity Measurements on Polymer–Multiwalled Carbon Nanotubes Composites," *J. Mater. Res.* 17:396–400 (2002).

Woo et al., "Hole Blocking in Carbon Nanotube–Polymer Composite Organic Light–Emitting Diodes Based on Poly (*m*–Phenylene Vinylene–Co–2, 5–Dioctoxy–*p*–Phenylene Vinylene)," *Applied Physics Letters* 77:1393–1395 (2000).

Yoshino et al., "Electrical and Optical Properties of Conducting Polymer–Fullerene and Conducting Polymer–Carbon Nanotube Composites," *Fullerene Science and Technology* 7:695–711 (1999).

\* cited by examiner

Figure 5

COMPOSITE MATERIALS COMPRISING POLAR POLYMERS AND SINGLE-WALL CARBON NANOTUBES

CROSS-REFERENCE TO RELATED APPLICATION

This application claims priority from U.S. provisional application Ser. No. 60/364,170, filed Mar. 14, 2002, which application is incorporated herein by reference.

FIELD OF THE INVENTION

This invention relates generally to single-wall carbon nanotubes, and more particularly to composites comprising single-wall carbon nanotubes and polar polymers, and even more particularly to composites of single-wall carbon nanotubes and polar polymers having high electrical and/or thermal conductivity.

BACKGROUND OF THE INVENTION

Single-wall carbon nanotubes (SWNT), commonly known as "buckytubes," have been the subject of intense research since their discovery due to their unique properties, including high strength, stiffness, and thermal and electrical conductivity. Single-wall carbon nanotubes are fullerenes consisting essentially of $sp^2$-hybridized carbon atoms typically arranged in hexagons and pentagons. For background information on single-wall carbon nanotubes see B. I. Yakobson and R. E. Smalley, *American Scientist*, Vol. 85, July–August, 1997, pp. 324–337. Multi-wall carbon nanotubes are nested single-wall carbon cylinders and possess some properties similar to single-wall carbon nanotubes. Multi-wall carbon nanotubes (MWNT) have been shown to be moderately effective in enhancing the electrical conductivity of composites that comprise MWNT in a polymer matrix. (see, for example S. A. Curran et al, *Advanced Materials*, Vol 10, p. 1091 (1998); J. N. Coleman et al., *Physical Review B*, Vol 58 p. R7492 (1998); Grimes et al., *Chemical Physics Letters*, Vol. 319, p. 460 (2000);and P. Fournet et al., *Journal of Applied Physics*, Vol. 90, p. 969 (2001)). However, since single-wall carbon nanotubes have fewer defects than multi-wall carbon nanotubes, the single-wall carbon nanotubes are generally stronger and more conductive, and are therefore expected to provide both mechanical enhancement and electrical conductivities in polymer composites. A small amount of work has been done in this area with methacrylate polymer matrices providing some useful results, but these results show relatively low electrical conductivities (Grimes et al., *Chemical Physics Letters*, Vol. 319, p. 460 (2000); R Haggenmueller et al., *Chemical Physics Letters*, Vol. 330, p. 219 (2000); J-M. Benoit et al., *Synthetic Metals*, Vol. 121, p. 1215 (2001)).

In polymers, single-wall carbon nanotubes have substantial potential for enhancing the polymers' strength, toughness, electrical conductivity and thermal conductivity. However, achieving the full potential of the properties of single-wall carbon nanotubes in polymers has been hampered by the difficulty of dispersing the nanotubes. A method for producing compositions comprising well-dispersed single-wall carbon nanotubes in polymeric materials is sought in order to achieve greater electrical and thermal conductivity in polymer composites.

SUMMARY OF THE INVENTION

The invention relates to a composite comprising a weight fraction of single-wall carbon nanotubes and at least one polar polymer wherein the composite has an electrical conductivity enhanced over that of the polymer alone. The invention also comprises a method for making this polymer composition. The present application provides composite compositions that, over a wide range of SWNT loading, have electrical conductivities exceeding those known in the art by more than one order of magnitude.

The electrical conductivity enhancement depends on the weight fraction (F) of the single-wall carbon nanotubes in the composite. The electrical conductivity of the composite of this invention is at least 5 Siemens per centimeter (S/cm) at (F) of 0.5 (i.e. where SWNT weight represents half of the total composite weight), at least 1 S/cm at a F of 0.1, at least $1 \times 10^{-4}$ S/cm at a F of 0.004, at least $6 \times 10^{-9}$ S/cm at a F of 0.001 and at least $3 \times 10^{-16}$ S/cm at a F of 0. The polar polymer can be a polycarbonate, poly(acrylic acid), poly (methacrylic acid), polyoxide, polysulfide, polysulfone, polyamide, polyester, polyurethane, polyimide, poly(vinyl acetate), poly(vinyl alcohol), poly(vinyl chloride), poly (vinyl pyridine), poly(vinyl pyrrolidone), copolymers thereof and combinations thereof. The preferred polar polymer is polycarbonate. The composite can further comprise a nonpolar polymer, such as, but not limited to, a polyolefin polymer, polyethylene, polypropylene, polybutene, polyisobutene, polyisoprene, polystyrene, copolymers thereof and combinations thereof. The average spacing between material elements comprising single wall carbon nanotubes, such as single-wall nanotubes themselves or single-wall carbon nanotube ropes in the composite is not more than 300 nanometers and these elements form a percolated 3-dimensional network comprising single-wall carbon nanotubes.

This invention additionally is a composite comprising a polymer and single-wall carbon nanotubes having a thermal conductivity enhanced over that of the polymer alone. The thermal conductivity of the composite is at least about 1 Watt/meter-° Kelvin (W/m° K) multiplied by the weight fraction (F) of the nanotubes in the composite.

BRIEF DESCRIPTION OF THE DRAWINGS

FIG. 3 shows the measured electrical conductivity of the composite of the present invention in comparison to those known in the art. This figure also plots a function giving the minimum conductivity of the composite of this invention for a range of weight fractions of SWNT in the composite. This function is defined below and graphically represents the properties of the composite of this invention. The conductivities measured for the composite compositions produced according to Example 1 below are indicated in the Figure. Points plotted as circles refer to data for SWNT, while points plotted as squares refer to data for MWNT.

DETAILED DESCRIPTION OF SPECIFIC EMBODIMENTS

One embodiment of this invention is a composite comprising a weight fraction of single-wall carbon nanotubes and at least one polar polymer wherein the composite has an electrical conductivity of at least 5 Siemens per centimeter (S/cm) multiplied by the weight fraction (F) of single-wall carbon nanotubes in the composite. The average spacing between material elements comprising single wall carbon nanotubes, such as single-wall nanotubes themselves or single-wall carbon nanotube ropes in the composite is not more than 300 nanometers and these elements form a percolated 3-dimensional network comprising single-wall carbon nanotubes. The thermal conductivity of the composite is at least about 1 Watt/meter-° K multiplied by the weight fraction (F) the nanotubes in the composite.

In one embodiment of this invention, the composite comprises single-wall carbon nanotubes and one or more polar polymers wherein the single-wall carbon nanotubes are highly dispersed in the polymer matrix formed by the polymers of the composite. In one embodiment, the composite comprises a polar polymer and a non-polar polymer in the polymer matrix. The composite is more electrically- and thermally-conductive than the polymer matrix would be without incorporation of the nanotubes due to the highly dispersed state of the single-wall carbon nanotubes in a polymer matrix that creates a 3-dimensional percolated network comprising multiple electrically- and thermally-conductive paths in the polymer matrix.

A polar polymer is one that possesses a polar chemical group. Suitable polar polymers include, but are not limited to, polycarbonate, poly(acrylic acid), poly(methacrylic acid), polyoxides, polysulfides, polysulfones, polyamides, polyesters, polyurethanes, polyimides, poly(vinyl acetate), poly(vinyl alcohol), poly(vinyl chloride), poly(vinyl pyridine), poly(vinyl pyrrolidone), copolymers thereof, and combinations thereof. The preferred polar polymer is polycarbonate. Single-wall carbon nanotubes and polar polymers can be suspended in highly-polar solvents such as dimethyl formamide. Relatively high concentrations of single-wall carbon nanotubes, i.e., from about 0.01 wt % to about 20 wt %, can be substantially uniformly dispersed in a matrix comprising one or more polar polymers with appropriate mixing procedures. Generally, the amount of nanotubes added to a polymer is desirably small, so that the mechanical and processing properties of the polymer are retained. With a uniform dispersion of single-wall carbon nanotubes in the nanotube-polymer composite, the composite can have high electrical and thermal conductivities without sacrificing the desirable polymer properties.

One of the keys to formulation of effective composite compositions comprising polymer matrices and single-wall carbon nanotubes is to achieve a high level of dispersion of the single-wall carbon nanotubes in the polymer matrix. Choice of a polar polymer for the matrix material is one aspect of this invention. Without being limited by theory, it appears that the choice of a polar polymer for the matrix material enhances the dispersion of the SWNT in the matrix. SWNT are known to be highly polarizable molecules. This enhanced dispersion of SWNT in polar polymer matrices is believed to be due to interaction of the polar groups on the polymer with the SWNT.

In one embodiment, the nanotube-polymer composite comprises single-wall carbon nanotubes and at least one polar polymer. In another embodiment, the nanotube-polymer composite comprises single-wall carbon nanotubes, one or more polar polymers and one or more non-polar polymers. Such non-polar polymers include, but are not limited to, polyolefin polymers, polyethylenes, polypropylenes, polyisobutylenes, polybutenes, polystyrenes, polyisobutylenes, polybutenes, copolymers thereof and combinations thereof. Generally, single-wall carbon nanotubes do not disperse well in non-polar polymers, however, polar polymers can blend well with non-polar polymers.

In one embodiment, the composite comprises a weight fraction (F) [where (F) is defined as the single-wall carbon nanotube weight in the composite divided by the total weight of the composite] of single-wall carbon nanotubes and at least one polar polymer, wherein the weight fraction (F) is greater than zero and less than 0.5, and wherein the electrical conductivity of the composite is:

(a) at least 10F Siemens/cm when $0.10 \leq F < 0.50$ (b) at least $410(F-0.001)^{2.6}$ Siemens/cm when $0.004 \leq F < 0.1$ and (c) at least $7 \times 10^{12}(F-0.00001)^7$ Siemens/cm when $F < 0.004$ Throughout, weight fractions may be defined in units of wt % or without units. The skilled artisan will understand that, e.g., 10 wt % corresponds to a weight fraction of 0.10.

In another embodiment, the composite comprises a weight fraction (F) of single-wall carbon nanotubes and at least one polar polymer, wherein the electrical conductivity of the composite of this invention is at least 5 Siemens per centimeter (S/cm) when $F > 0.5$, at least 1 S/cm when $0.5 > F \geq 0.1$, at least $1 \times 10^{-4}$ S/cm when $0.1 > F \geq 0.004$, at least $6 \times 10^{-9}$ S/cm when $0.004 > F \geq 0.001$ and at least $3 \times 10^{-16}$ S/cm when $0.001 > F \geq 0.0001$.

In one embodiment, the composite comprises a weight fraction (F) of single-wall carbon nanotubes and at least one polar polymer, wherein the thermal conductivity of the composite is at least about 1 Watt/meter-° K multiplied by the weight fraction (F).

In one embodiment, the composite comprises a weight fraction (F) of single-wall carbon nanotubes and at least one polar polymer, wherein the thermal conductivity of the composite is at least about 1 Watt/meter-° K multiplied by the weight fraction (F).

In one embodiment, single-wall nanotubes are dispersed initially in one or more polar polymers, and the resulting mixture is subsequently blended with one or more nonpolar polymers. In another embodiment, a mixture comprising one or more polar polymers and one or more non-polar polymers is prepared and then the single wall carbon nanotubes are added and dispersed.

In one embodiment of this invention, the single-wall carbon nanotubes are dispersed in a solvent that is also a solvent for the polar polymer. The solvent-dispersed nanotubes are then mixed with the polar polymer. After thorough mixing, the solvent is extracted, optionally under vacuum, while heating the solvent-polymer-nanotube mixture. Optionally, the mixing may be aided by heating, sonication, mechanical mixing or a combination thereof. The mixing of single-wall carbon nanotubes with at least one polar polymer produces a uniform distribution of single-wall carbon nanotubes in the polymer or polymer blend.

When the polar polymer is polycarbonate, uniform dispersions of single-wall carbon nanotubes can be obtained up to about 40 wt % of single-wall carbon nanotubes in the composite. In certain embodiments, polar polymer-single-wall-carbon-nanotube composites with polycarbonate have an electrical conductivity in excess of 20 Siemens/cm multiplied by the weight fraction single-wall carbon nanotubes in the composite material. These compositions have a thermal conductivity in excess of 10 Watts/meter-° K multiplied by the weight fraction of the single-wall carbon nanotubes in the composite.

In various embodiments of the invention, composites comprising single-wall carbon nanotubes, at least one polar polymer and, optionally, at least one non-polar polymer have enhanced electrical and thermal conductivity which make them useful in applications that require conduction of heat, conduction of electric charge, electromagnetic shielding, or a combination thereof. The mechanical and processing properties of the mixture of polar and non-polar polymers are retained or enhanced, while the electrical and thermal conductivities of the composite are enhanced.

The following example is included to demonstrate preferred embodiments of the invention. It should be appreciated by those of skill in the art that the techniques disclosed in the example which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

0.5 g single-wall carbon nanotubes and 4.75 g polycarbonate were dispersed in 250 g chloroform for 12 hours using a magnetic stirrer. The dispersion was then sonicated for 30 minutes with a Branson high-amplitude wedge-tip ultrasonic horn with a Branson 940B power supply at a power setting of approximately 300 Watts. The solvent was then removed from the mixture in a resin kettle using heat, vacuum and mechanical stirring. The solvent removal process required about three hours. The polymer mixture was removed from vessel while still damp, and residual solvent was removed at 60° C. in an oven. The resulting polymer-SWNT composite was pressed into a sheet of approximately 1 millimeter thickness with a 2-platen press. This procedure produced a sample with a weight fraction of SWNT of approximately 0.1. Several samples with different weight fractions of SWNT were made according to this process by using the same amount of polycarbonate but different initial weights of SWNT.

Figure 1:
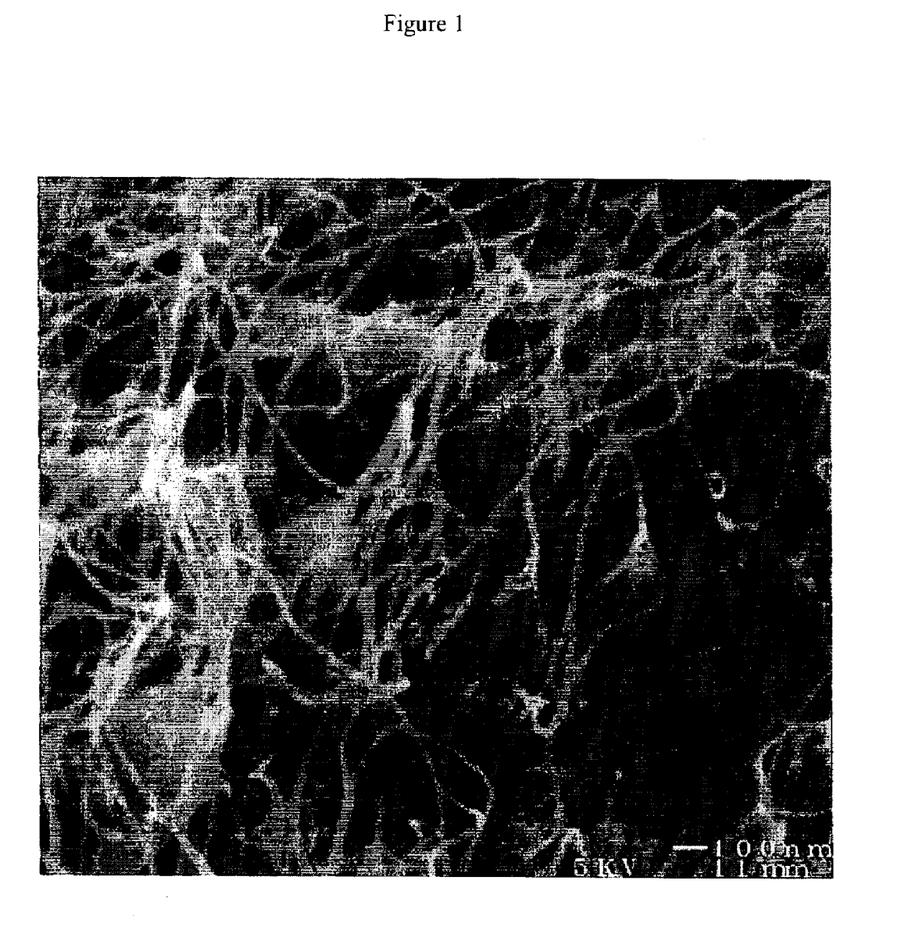
FIG. 1 shows a scanning electron micrograph of a freeze-fractured surface of a SWNT-polycarbonate composite specimen. This example has a SWNT weight fraction of about 0.10. The SWNT material is clearly well-dispersed.

Scanning electron microscopy (SEM) of the composite samples produced was performed. FIG. 1 shows a scanning electron micrograph of the freeze-fractured surface of the SWNT-polycarbonate composite sample with a SWNT weight fraction of about 0.10.

Figure 2:
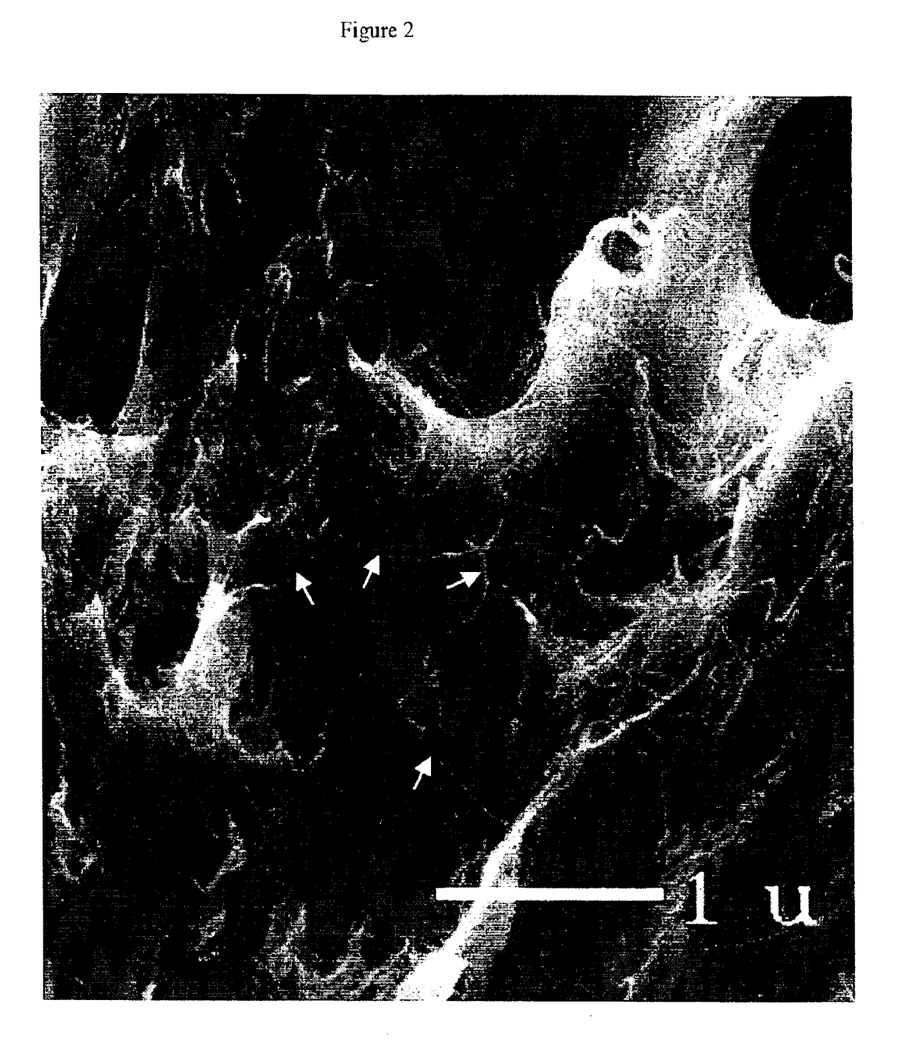
FIG. 2 shows a scanning electron micrograph of a freeze-fractured surface of a SWNT-polycarbonate composite specimen. This example has a SWNT weight fraction of about 0.01. The SWNT material is clearly well-dispersed, but the density of dispersed material is clearly less than that shown in FIG. 1. White arrows indicate material comprising SWNT.

FIG. 2 shows a similar electron micrograph of the SWNT-polymer composite with a SWNT weight fraction of about 0.01. The micrographs show an excellent dispersion of single-wall nanotubes in the polymer matrix. The average spacing between nanotube structures (including individual nanotubes and/or ropes of nanotubes) is less than 300 nm.

The electrical conductivity of the pressed sheet of composite material was measured using both AC and DC currents. The AC conductivity was measured at 1 kilohertz using a Hewlett Packard 4284A Precision LCR Meter using a 4-lead technique, and the DC conductivity was measured using a Keithley 2400 sourcemeter using a 4-lead technique. The results of these measurements are shown in FIG. 3, where they are designated as "Example 1, AC measurement and DC measurement"

Figure 3:
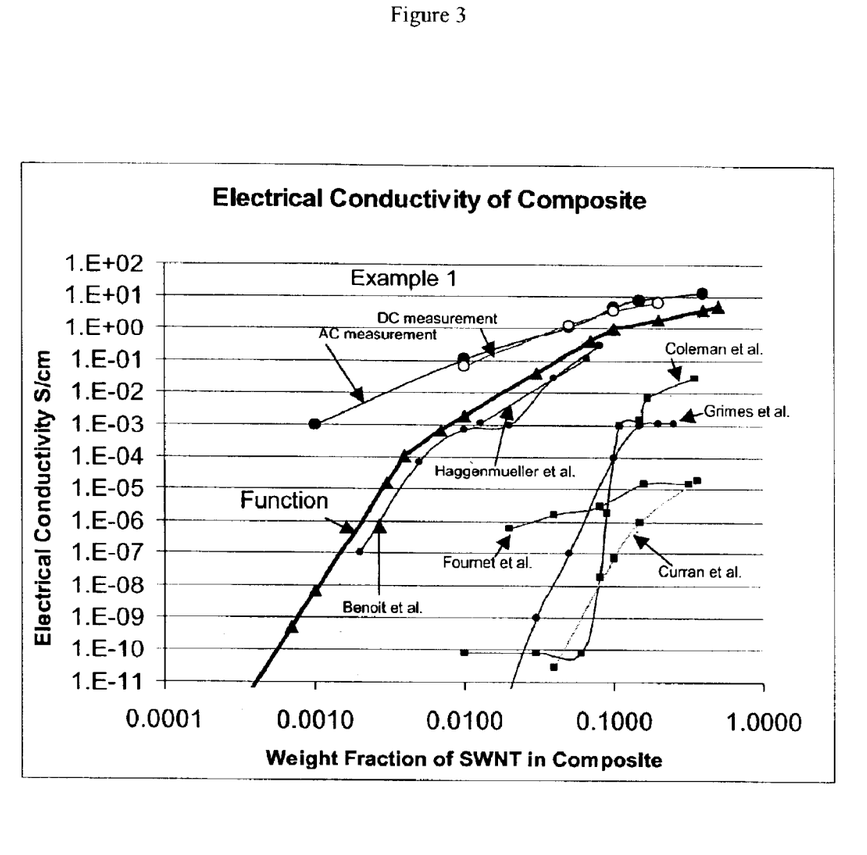
Figure 4:
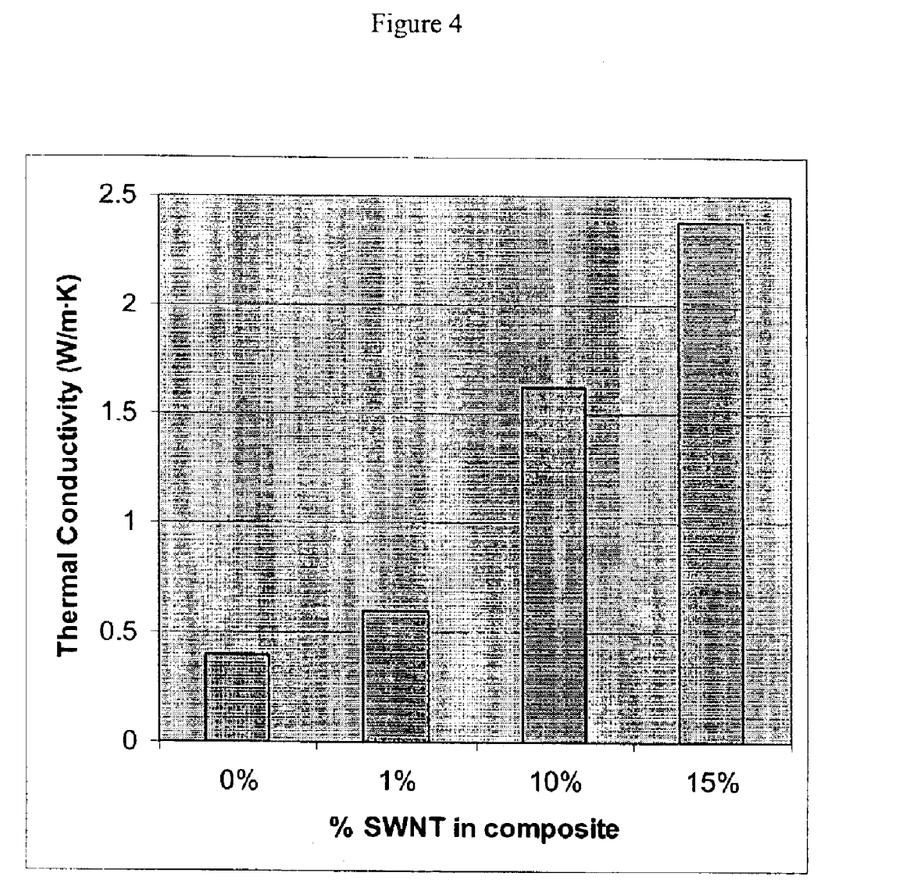
FIG. 4 shows the measured thermal conductivity of the composite of the present invention.
Figure 5:
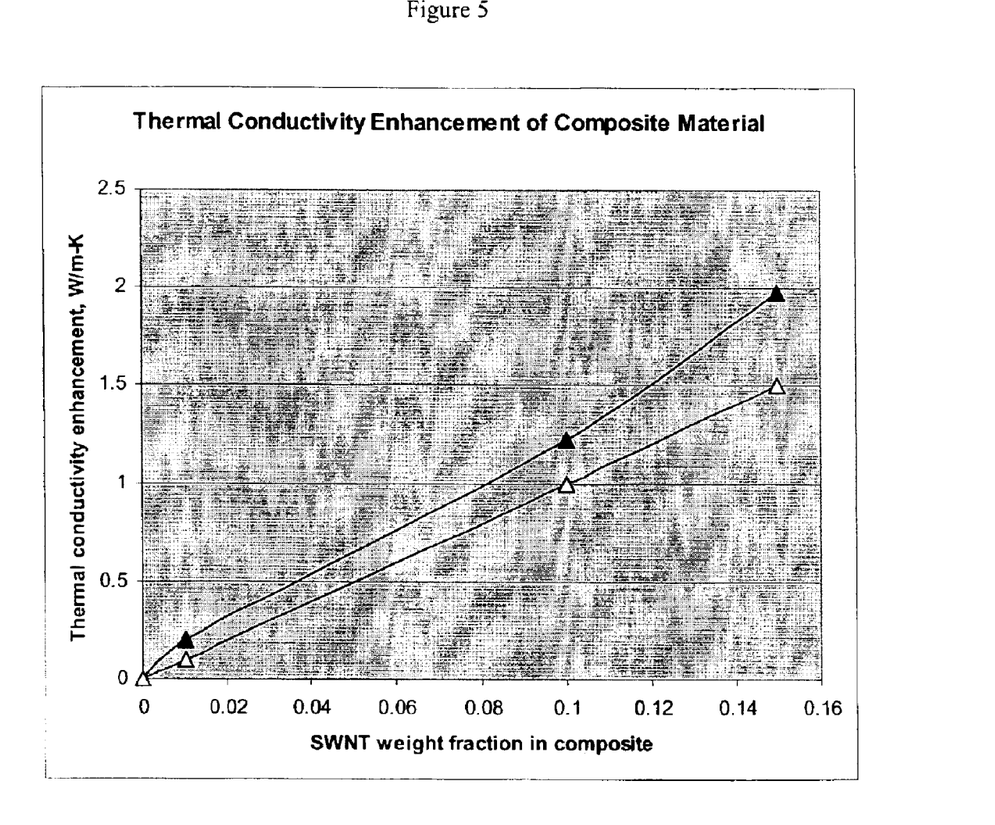
FIG. 5 shows the enhancement to thermal conductivity of the composite of FIG. 4 provided by addition of SWNT. This is a plot of the difference between the thermal conductivity of the pure polymer matrix material and the thermal conductivities of the composite samples prepared according to Example 1 comprising SWNT. The solid triangles are the data from Example 1 and the open triangles represent a line given by Thermal conductivity (W/m-° K)=10F, where F is the weight fraction of SWNT in the composite.

As is indicated in FIG. 3, the present invention provides a composite conductivity that is more than one order of magnitude (per carbon weight fraction) greater than that of previously known carbon-loaded composites. The region in FIG. 3 above the line indicated "Function" represents the set of parameters for the electrical conductivity of the present invention. The set of values plotted by the line indicated "Function" on FIG. 3 is given below:

For SWNT weight fractions between 0.50 and 0.10,
Function (in Siemens/cm)=$10 \times (F)$
For SWNT weight fractions between 0.10 and 0.004,
Function (in Siemens/cm) $410 \times (F-0.001)^{2.6}$
For SWNT weight fractions between 0.004 and 0
Function (in Siemens/cm)=$7 \times 10^{12} \times (F-0.00001)^{7}$ Thermal conductivity was measured using a steady-state, one-heater two-thermometer technique, and the results of the measurement are shown in FIGS. 4 and 5. The SWNT network in the composite substantially enhances its thermal conductivity as is clearly indicated. This example provides the first embodiment of a measured enhancement of thermal conductivity of a SWNT-polymer composite. The line with solid triangles in FIG. 5 is the thermal conductivity enhancement measured at different weight fractions (F) of SWNT for composite compositions of this invention. The line with open triangles is given by Thermal conductivity (Watts/meter-Kelvin)=$10 \times F$.

What is claimed is:

1. A composite comprising single-Well carbon nanotubes, at least one polar polymer selected from the group consisting of polycarbonate, poly(acrylic acid), poly(methacrylic acid), polyoxide, polysulfide, polywulfone, polyamide, polyester, polyurethane, polyimide, poly(vinyl acetate), poly(vinyl alcohol), poly(vinyl chloride), poly(vinyl pyridine), poly(vinyl pyrrolidone), copolymers thereof, and combinations thereof, and at least one nonpolar polymer, wherein the single-wall carbon nanotubes are present in the composite in an amount in the range of about 0.01 wt % and 20 wt % of the composite, wherein the composite has an electrical conductivity and wherein the single-wall carbon nanotubes are presented om a weight fraction F, and wherein the electrical conductivity of the composite is:

i) at least 5 Siemens per centimeter (S/cm) when $F \geq 0.5$,
ii) at least 1 S/cm when $0.5 > F \geq 0.1$,
iii) at least $1 \times 10^{-4}$ S/cm when $0.1 > F \geq 0.004$
iv) at least $6 \times 10^{-9}$ S/cm when $0.004 > F \geq 0.001$, and
v) at least $3 \times 10^{-16}$ S/cm when $0.001 > F \geq 0.0001$.

2. The composite of claim 1 wherein the at least one nonpolar polymer cornprises a polyolefin.

3. The composite of claim 1 wherein the at least one nonpolar polymer comprises a polymer selected from the group consisting of polyethylene, polypropylene, polybutene, polyisobutene, polyisoprene, polyisobutylene, polystyrene, copolymers thereof, and combinations thereof.

4. The composite of claim 1 where the average spacing between single-wall nanotubes in the composite is not more than 50 nanometers.

5. The composite of claim 1 wherein the composite has a thermal conductivity of at least about 10 watts/meter-° K multiplied by the weight fraction of the nanotubes in the composite.

6. A composite of claim 1 wherein the single-wall carbon nanotubes form a percolated 3-dimensional network in the composite.

7. A method for forming a composite comprising single-wall carbon nanotubes, at least one polar polymer selected from the group consisting of polycarbonate, poly(acrylic acid), poly(methacrylic acid), polyoxide, polysulfide, polysulfone, polyamide, polyester, polyurethane, polyimide, poly(vinyl acetate), poly(vinyl alcohol), poly(vinyl chloride), poly(vinyl pyridine), poly(vinyl pyrrolidone), copolymers thereof, and combinations thereof, and at least one non-polar polymer, comprising:

a) dispersing the single-wall carbon nanotubes, the at least one polar polymer, and the at least one non-polar polymer in a solvent to make a nanotube-polymer suspension; and b) removing the solvent from the suspension to form a nanotube-polymer composite wherein the single-wall carbon nanotubes are present in the composite in an amount in a range of about 0.01 wt % and about 20 wt % of the composite, wherein the composite has an electrical conductivity and wherein the single-wall carbon nanotubes are present in a weight fraction F, and wherein the electrical conductivity of the composite is:

i) at least 5 Siemens per centimeter (S/cm) when $F \geqq 0.5$, ii) at least 1 S/cm when $0.5 > F \geqq 0.1$.

iii) at least $1 \times 10^{-4}$ S/cm when $0.1 > F \geqq 0.004$, iv) at least $6 \times 10^{-9}$ S/cm when $0.004 > F \geqq 0.001$, and v) at least $3 \times 10^{-16}$ S/cm when $0.001 > F \geqq 0.0001$.

8. The method of claim 7 wherein the at least one non-polar polymer comprises a polyolefin.

9. The method of claim 7 wherein the at least one non-polar polymer comprises a polymer selected from the group consisting of polyethylene, polypropylene, polybutene, polyisobutene, polyisoprene, polystyrene, copolymers thereof and combinations thereof.

10. The method of claim 7 wherein the dispersing is done by a method selected from the group consisting of sonication, mechanical mixing, and a combination thereof.

11. The method of claim 7 wherein further comprising heating the suspension.

12. The method of claim 7 wherein the average spacing between single-wall nanotubes in the composite is not more than 50 nanometers.

13. The method of claim 7 wherein the composite has a thermal conductivity of at least about 10 watts/meter-° K multiplied by the weight fraction of the nanotubes in the composite.

14. A method of the claim 7 wherein the single-wall carbon nanotubes form a percolated 3-dimensional network in the composite.

* * * * *

UNITED STATES PATENT AND TRADEMARK OFFICE
CERTIFICATE OF CORRECTION

PATENT NO. : 6,936,653 B2
DATED : August 30, 2005
INVENTOR(S) : Kenneth O. McElrath et al.

It is certified that error appears in the above-identified patent and that said Letters Patent is hereby corrected as shown below:

Column 6,
Line 35, delete "single-Well" and insert -- single-wall --.
Line 38, delete "polywulfone" and insert -- polysulfone --.
Line 47, delete "presented om" and insert -- present in --.

Signed and Sealed this

Fourteenth Day of February, 2006

JON W. DUDAS
*Director of the United States Patent and Trademark Office*